(12) United States Patent  (10) Patent No.: US 7,049,967 B2
Grasselli et al.  (45) Date of Patent: May 23, 2006

(54) SAFETY SYSTEM FOR MACHINE TOOLS

(76) Inventors: Giorgio Grasselli, 2, Via Roversi, I-42020 Albinea (Reggio Emilia) (IT); Stefano Santini, 34, Via S. Moretti, I-42100Reggio Emilia (IT)

( * ) Notice: Subject to any disclaimer, the term of this patent is extended or adjusted under 35 U.S.C. 154(b) by 148 days.

(21) Appl. No.: 10/402,573

(22) Filed: Mar. 28, 2003

(65) Prior Publication Data

US 2003/0193400 A1  Oct. 16, 2003

(30) Foreign Application Priority Data

Apr. 12, 2002  (IT)  .......................... RE2002A0030

(51) Int. Cl.
*G08B 23/00*  (2006.01)

(52) U.S. Cl. ..................... 340/573.1; 192/130; 340/540

(58) Field of Classification Search ............. 340/573.1, 340/540, 604, 605; 606/34; 192/130, 131 R; 2/159, 160, 161.6, 161.7, 164
See application file for complete search history.

(56) References Cited

U.S. PATENT DOCUMENTS 3,953,770 A * 4/1976 Hayashi ................... 340/573.1
5,025,175 A * 6/1991 Dubois, III ............. 192/129 A
5,157,379 A * 10/1992 Dennison .................... 340/540
5,272,946 A * 12/1993 McCullough et al. ... 192/131 R
5,389,097 A * 2/1995 Bennett et al. ................ 606/34
5,448,177 A * 9/1995 Thompson .................. 340/540
5,510,685 A * 4/1996 Grasselli ..................... 192/130

FOREIGN PATENT DOCUMENTS

DE  35 01 021  7/1985
EP  0 362 937  4/1990
EP  0 636 820  2/1995

* cited by examiner

*Primary Examiner*—Thomas Mullen
(74) *Attorney, Agent, or Firm*—Browdy and Neimark, PLLC

(57) ABSTRACT

Safety system for a manufacturing machine provided with at least one tool which can injure the operator, comprising a pair of gloves to be worn by the operator and provided with an outer surface of dielectric material and an electrically conductive inner surface; an alarm signal generator connected to the conductive inner surface; a processor unit connected to the metal machine members and to the at least one tool via a safety circuit arranged to sense the alarm signal when the operator cuts one of the gloves on coming into contact with one of the mechanical members of the machine, the processor unit being provided with circuitry for interrupting machine operation on sensing said alarm signal, in which the alarm signal is an alternating current signal the intensity of which is established by the processor unit on the basis at least of at least one of the physical characteristics of the operator, e.g. the electrical conductivity, as measured by a suitable circuit for determining at least this characteristic.

18 Claims, 2 Drawing Sheets

SAFETY SYSTEM FOR MACHINE TOOLS

FIELD OF THE INVENTION

This invention relates to safety devices provided in manufacturing machines to safeguard operator safety.

In particular, the safety system of the invention is applicable to any type of manufacturing machine having at least one moving member or tool with which the operator can accidentally come into contact.

DESCRIPTION OF THE RELATED ART

Manufacturing machines are generally provided with systems ensuring operator safety.

These systems can be either mechanical or electrical.

Electrical systems are those currently most used as they generally have a shorter intervention time than similar mechanical devices.

A safety system of electrical type, applied to a manufacturing machine, is fully described in U.S. Pat. No. 5,510,685 in the name of the same applicant.

Specifically, said patent application describes an electrical safety system applied to a flaying machine.

Said known safety system, for a detailed description of which reference should be made to said patent application, is substantially based on sensing a voltage variation caused by the passage of a direct current through the operator's body when he comes into electrical contact with the tool.

It has been found during the use of said system that it is influenced by the electro-physical characteristics of the operator, i.e. substantially by his electrical conductivity, which varies considerably while he is working, and by the conditions of the environment in which the machine operates. In this respect, when the machine operates in a very humid environment the intensity of said direct current signal is influenced by the parasitic impedance of the machine towards earth. This causes variations in the intervention threshold of the safety system, causing it to intervene unnecessarily or untimely.

BRIEF SUMMARY OF THE INVENTION

The object of this invention is to overcome the stated drawbacks within the context of a solution of simple construction and of safe and reliable operation.

The invention attains said object by providing a safety system, to be associated with manufacturing machines provided with at least one tool able to injure the operator, which is not influenced by the electro-physical characteristics of the operator, and of which the operation is independent of the environmental conditions in which the machine operates.

Specifically, the safety system of the invention comprises a pair of gloves to be worn by the operator and provided with an outer surface of dielectric material and an electrically conductive inner surface, a signal generator connected to said conductive inner surface, a processor unit connected to the metal machine members and to said at least one tool via a safety circuit arranged to produce an alarm signal when the operator cuts one of said gloves on coming into contact with one of the mechanical members or with one of the tools of the machine, said processor unit being provided with means for interrupting machine operation on sensing said alarm signal, said alarm signal being derived from an alternating current signal the intensity of which is established by said processor unit on the basis at least one of the physical characteristics of the operator, e.g. the electrical conductivity, as measured by a suitable circuit for determining at least this characteristic.

Said circuit for determining the physical characteristics of the operator comprises at least one generator of a second signal, namely a signal indicative of the presence of the operator and of his electro-physical characteristics.

Said second generator is connected to the operator's gloves and to said processor unit, an adapter circuit preferably being interposed.

In a preferred embodiment the two gloves worn by the operator are connected together via a capacitor, one terminal of which is connected to an adder device provided to add (or modulate) the alternating current signal to the direct current signal indicative of the physical characteristics of the operator, and of which the other terminal is connected to the processor unit, there being interposed at least one adapter circuit for the alternating current signal and at least one adapter circuit for the direct current signal indicative of the operator characteristics. In addition between said adder and at least the alternating current signal generator suitable means are inserted to regulate the intensity of said signals. Said means preferably comprise potentiometers electrically connected to the processor unit, by which the processor unit regulates the intensity of said signal.

Those characteristics of the invention which enable said objects to be attained are defined in the claims.

The safety system of the invention is described hereinafter with the aid of the accompanying drawings, in an embodiment for application to a flaying machine, it being apparent however that the application of the invention is not limited to this type of machine.

DETAILED DESCRIPTION OF THE INVENTION

Figure 1:
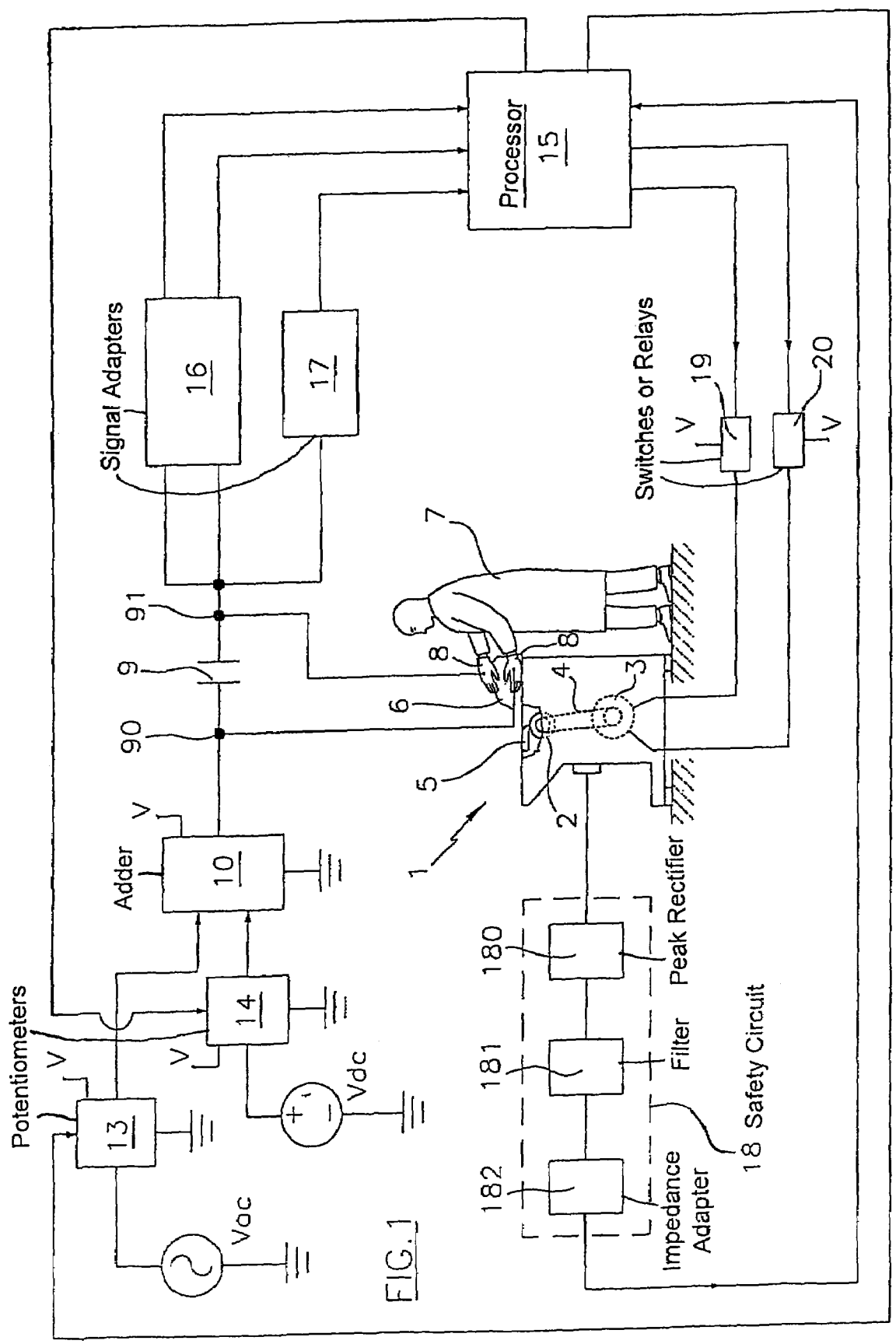
FIG. 1 is a schematic representation of the safety system of the invention applied to a flaying machine.

FIG. 1 shows a usual flaying machine 1 provided with a toothed roller 2 rotated by the electric motor 3 via the toothed belt 4.

The roller 2 drags a piece of meat 6, held manually by the operator 7, to subject it to the action of a fixed blade 5 able to interact with the piece of meat 6 to separate the skin from the flesh of the meat.

The task of the operator 7 is to urge the piece of meat 6 against the roller 2, his hands hence operating in proximity to the roller 2 and blade 5.

Figure 4:
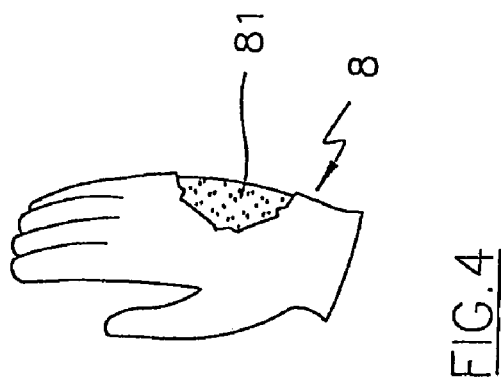
FIG. 4 shows the gloves which must be worn by the operator during the use of the machine.
Figure 2:
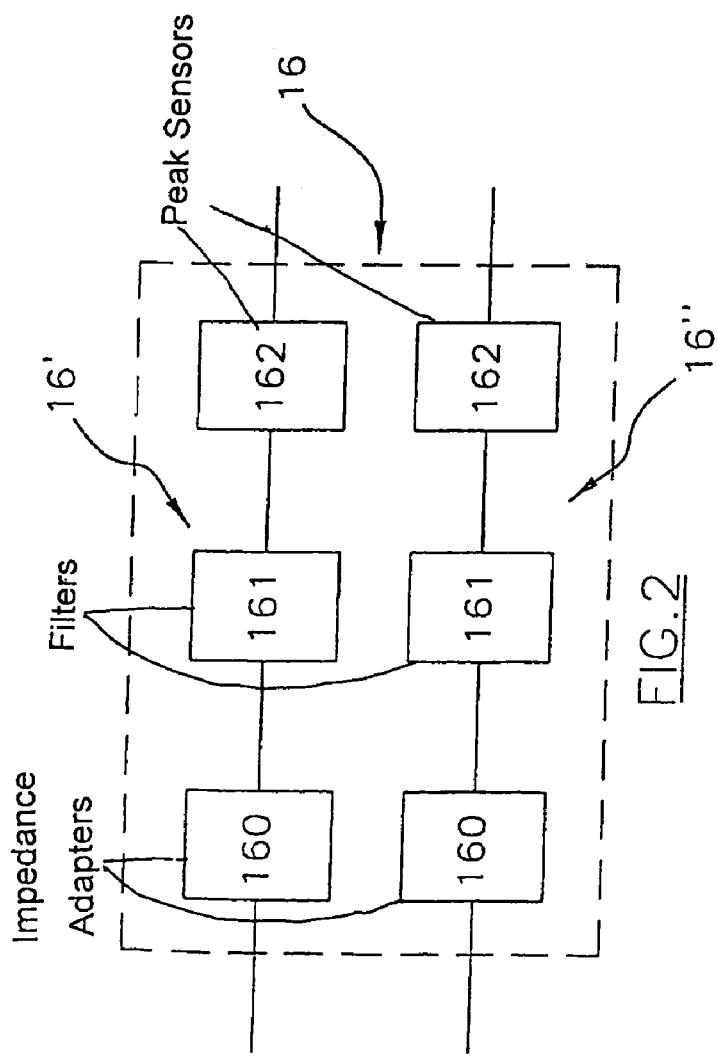
FIG. 2 is a block diagram of a first circuit with which the system of the invention is provided.
Figure 3:
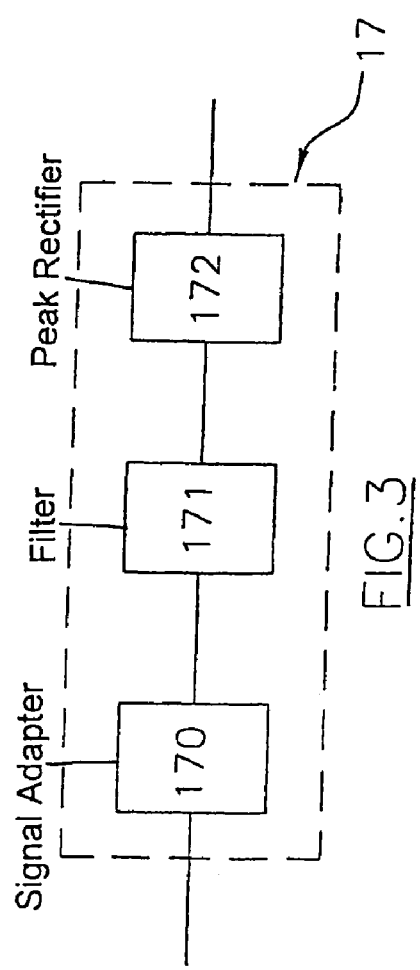
FIG. 3 is a block diagram of a second circuit with which the system of the invention is provided.

As can be seen from the figures, for correct operation of the system the operator 7 must wear a pair of dielectric gloves 8, shown in FIG. 4, preferably provided with a metal or otherwise electrically conductive inner surface 81.

The conductive internal parts of the gloves 8 worn by the operator 7 are connected electrically together via a capacitor 9 having a capacitance of between 100 nF and 3 µF, which in the illustrated embodiment has a capacitance of 1 µF. The terminal 90 of the capacitor is connected to an adder device 10 for adding together the voltage signals of an alternating voltage signal generator Vac generating a signal at a frequency of between 2 kHz and 40 kHz, and a direct voltage signal generator Vdc generating a direct current signal of between 0 and +15 V.

Between each of said signal generators and the adder device 10, means are inserted for regulating the intensity of the signals generated by each of the generators. Said means comprise, in the illustrated embodiment, digital potentiometers 13 and 14, which enable the intensity of the voltage signals generated by the respective generator to be regulated.

Specifically, the signal generator Vac generates an alternating voltage signal at 8 kHz, from which an alarm signal will be generated in a safety circuit 18, to be described below, the purpose of the alarm signal being to indicate the presence of a situation dangerous for the operator, while the signal generator Vdc generates a direct voltage signal at 5 V, the purpose of which is to verify the presence of the operator, and his electro-physical characteristics as will be clarified hereinafter.

The intensity of said signals is regulated by a processor unit 15 electrically connected to said digital potentiometers 13 and 14, and connected to the terminal 91 of the capacitor 9 by way of suitable signal adapter circuits 16 and 17, described in detail hereinafter.

The purpose of the adapter circuit 16 is to measure the direct current signal generated by the signal generator Vdc, which is indicative of the presence of the operator in his working position and is able to measure his electro-physical characteristics, i.e. basically his conductivity. This circuit comprises two identical circuits 16' and 16" in parallel, each of which consists of an impedance adapter device 160, a low pass filter 161, and a peak sensor 162. It should be noted that the presence of the two identical circuits 16' and 16" is due to the fact that the conductivity of the operator varies considerably while he works, hence below a certain voltage value the signal is measured by the circuit 16', whereas above said predetermined value it is measured by the circuit 16".

The purpose of the adapter circuit 17 is to indicate the presence of the alternating current signal to the processor unit 15. This circuit comprises a signal adapter device 170, a band pass filter 171 and a peak rectifier 172. In the illustrated example the processor unit 15 is a microcontroller produced by the HITACHI Company with the identification symbol HD64F3337. Said processor unit is connected to safety circuit 18, itself electrically connected to all the metal parts of the machine 1, that produces the alarm signal that will be sensed by which the processor unit, the alarm signal being indicative of the fact that the operator has cut one of the dielectric gloves he wears while working.

Said safety circuit 18 comprises an impedance adapter 180, a band pass filter 181 and a peak rectifier 182.

The processor unit 15 also performs the task of interrupting machine operation on sensing the said alarm signal. For this purpose it is connected to the drive motor of the roller 2 by way of two switches or relays 19 and 20, which control the movement of the roller 2 in one and the other direction.

The operation of the safety system with which the invention is provided is described hereinafter with the aid of the accompanying figures.

As already stated, the operation of the safety system of the invention requires the user to wear a pair of gloves 8 having at least the outer surface formed of dielectric material, and preferably but not necessarily the inner surface, that in contact with the skin of the hands, formed of conductive material.

After the operator has put on the gloves he presses the machine start button.

The direct current signal generator generates a signal of value 5 V, which is modulated by the adder device 10 with the alternating current signal generated by the generator Vac. The alternating component of the modulated signal is available at the internal conductive part of both the gloves of the operator via the capacitor 9, and is measured by the processor unit 15 via the adapter circuit 17. Instead the direct current component through the operator's body, having its passage blocked by the capacitor 9, is available to the processor unit 15 via the adapter circuit 16.

The processor unit 15 hence senses separately the presence of the alternating current signal and of the direct voltage signal which is indicative of the presence of the operator, its intensity being indicative of the electrical conductivity of the operator. On the basis of the intensity of the measured values of both the signals, the processor unit 15 regulates the two digital potentiometers 13 and 14 such as to maintain these values at an optimum level for measurement as a function of the electro-physical characteristics of the operator. If the operator cuts one of the gloves while working, the alarm signal is sensed by the processor unit via said safety circuit. When the processor unit senses said alarm signal. before halting the machine it causes the motor 3 to rotate in the reverse direction so that if the operator has remained gripped by the roller he can disengage himself from it.

It should be noted that as the alternating current alarm signal and the safety circuit are isolated from earth, the sensing of the alarm signal is not influenced by parasitic impedances between the machine casing and earth.

Finally, it should be noted that although the circuits are shown as separate circuits, in certain embodiments of the invention they can be integrated into a single circuit supported by a single electronic card.

The invention claimed is:

1. A safety system for protecting an operator of a machine having movably mounted metal machine members, the machine members all being electrically connected to one another and including at least one metal tool, an electric motor being coupled to the metal machine members for moving said tool, said system comprising:

a pair of gloves to be worn by the operator and each provided with an outer surface of dielectric material and an electrically conductive inner surface that will contact a respective hand of the operator when the gloves are being worn, so that the operator's body presents an electrical impedance between said electrically conductive inner surfaces, an alternating current signal generator connected for supplying an alternating current to said conductive inner surface of each of said gloves, a processor unit connected to the machine for interrupting machine operation in response to an alarm signal, and a safety circuit connected to form a current conducting path between the machine members and said processor unit, wherein the alternating current from said alternating current generator has a first amplitude value and flows through the operator's body between said electrically conductive inner surfaces of said gloves when neither of said electrically conductive inner surfaces is in contact with any metal machine member, and the alternating current has a second amplitude value when either one of said electrically conductive inner surfaces is in contact with a metal machine member, and the alternating current flows to said safety circuit to cause said safety circuit to produce the alarm signal when the alternating current has the second amplitude value, which alarm signal is sensed by said processing unit.

2. A system as claimed in claim 1, characterised in that said alternating current signal generator generates a voltage wave at a frequency between 2 and 40 kHz.

3. A system as claimed in claim 1, further comprising at least one second generator for generating at least one second signal connected to said electrically conductive inner surfaces of said operator's gloves and a circuit for sensing said second signal connected to said processor unit.

4. A system as claimed in claim 3, characterised in that said second signal is a direct current signal between 0 and +15 V.

5. A system as claimed in claim 3, characterised in that downstream of said second signal generator there is positioned at least one means for regulating the intensity of the at least one second signal.

6. A system as claimed in claim 5, characterised in that said at least one means is a potentiometer connected to and controlled by said processor unit, to regulate the intensity of the at least one second signal.

7. A system as claimed in claim 3, characterised in that said alternating current signal and said at least one second signal are modulated by a suitable adder device.

8. A system as claimed in claim 7, further comprising an impedance having a first terminal connected to said adder device and a second terminal connected to the processor unit via a first adapter circuit for measuring the intensity of the alternating current signal and at least one second adapter circuit for measuring the intensity of the at least one second signal.

9. A system as claimed in claim 8, characterised in that said at least one second adapter circuit comprises an impedance adapter device, a low pass filter and a peak sensor.

10. A system as claimed in claim 8, characterised in that said first adapter circuit comprises a signal adapter device, a band pass filter, and a peak rectifier.

11. A system as claimed in claim 1, characterised in that said processor unit is a microcontroller.

12. A system as claimed in claim 1, characterised in that said safety circuit comprises an impedance adapter, a band pass filter and a peak rectifier.

13. A system as claimed in claim 1, characterised in that said processor unit comprises means constituted by two controlled switches or relays for interrupting the machine operation.

14. A system as claimed in claim 1, characterised in that downstream of said alternating current signal generator there is interposed at least one means for regulating the intensity of the alternating current supplied by said alternating current signal generator.

15. A system as claimed in claim 14, characterised in that said at least one means for regulating the intensity of the alternating current supplied by said alternating current signal generator is a potentiometer connected to and controlled by said processor unit, to regulate the intensity of the alternating current supplied by said alternating current signal generator.

16. A system as claimed in claim 1, characterised in that said gloves are connected together by an impedance.

17. A system as claimed in claim 16, characterised in that said impedance comprises a capacitor.

18. A system as claimed in claim 17, characterised in that said capacitor has a capacitance between 100 nF and 3 μF.

* * * * *